United States Patent
Liu

(10) Patent No.: US 11,955,039 B2
(45) Date of Patent: Apr. 9, 2024

(54) METHOD AND APPARATUS FOR CONTROLLING DISPLAY IN A SCREEN PROJECTION SCENARIO, DEVICE AND PROGRAM PRODUCT

(71) Applicant: Apollo Intelligent Connectivity (Beijing) Technology Co., Ltd., Beijing (CN)

(72) Inventor: Rong Liu, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/696,736

(22) Filed: Mar. 16, 2022

(65) Prior Publication Data
US 2022/0208039 A1    Jun. 30, 2022

(30) Foreign Application Priority Data

Apr. 16, 2021   (CN) .......................... 202110412533.0

(51) Int. Cl.
  *G09G 3/00*    (2006.01)
  *G10L 15/18*   (2013.01)
  *G10L 15/22*   (2006.01)

(52) U.S. Cl.
  CPC .......... *G09G 3/002* (2013.01); *G10L 15/1815* (2013.01); *G10L 15/22* (2013.01);
  (Continued)

(58) Field of Classification Search
  CPC ...... G06F 3/167; G06F 3/1423; G06F 3/1454; G10L 15/22; G10L 15/1815;
  (Continued)

(56) References Cited

U.S. PATENT DOCUMENTS

| 10,706,853 B2 | 7/2020 | Baba |
| 2002/0032510 A1 * | 3/2002 | Turnbull ................ H01Q 5/371 701/49 |

(Continued)

FOREIGN PATENT DOCUMENTS

| CN | 104057887 A | 9/2014 |
| CN | 104301507 A | 1/2015 |

(Continued)

OTHER PUBLICATIONS

NetApp, What are Containers?—Benefits and Use Cases, Oct. 27, 2020, p. 1-5.*

(Continued)

*Primary Examiner* — Hang Lin
(74) *Attorney, Agent, or Firm* — J.C. PATENTS

(57) ABSTRACT

The present application discloses a method and apparatus for controlling display in a screen projection scenario, a device, a medium and a program product, relating to the technical fields of autonomous driving, Internet of Vehicles, intelligent voice, and screen projection in artificial intelligence. The specific implementation is: receiving a voice interaction instruction corresponding to a voice application; if a first page corresponding to a first application in at least one non-voice application has been projected onto a screen of a terminal device, adding to-be-displayed content corresponding to the voice application to the first page to obtain a to-be-projected page corresponding to the first application; and projecting the to-be-projected page onto the screen of the terminal device. The above process can reduce a delay in displaying an image projected on the screen.

16 Claims, 10 Drawing Sheets

(52) U.S. Cl.
CPC ..... *G09G 2354/00* (2013.01); *G09G 2380/10* (2013.01); *G10L 2015/223* (2013.01)

(58) Field of Classification Search
CPC .............. G10L 2015/223; B60K 35/00; B60K 2370/11; B60K 2370/182; B60K 2370/779; B60K 2370/148; G09G 3/002; G09G 2320/0252; G09G 2330/026; G09G 2354/00; G09G 2380/10; B60R 1/12
See application file for complete search history.

(56) References Cited

U.S. PATENT DOCUMENTS

| | | | |
|---|---|---|---|
| 2011/0202862 A1 | 8/2011 | Kramer | |
| 2017/0168774 A1* | 6/2017 | Sugita | G06F 3/167 |
| 2017/0278305 A1* | 9/2017 | Sisbot | G06F 3/167 |
| 2017/0357387 A1 | 12/2017 | Clarke | |
| 2018/0276908 A1 | 9/2018 | Mader | |
| 2018/0350365 A1 | 12/2018 | Lee | |
| 2019/0272820 A1 | 9/2019 | Xiang | |
| 2020/0021615 A1* | 1/2020 | Wainner | G06F 8/71 |

FOREIGN PATENT DOCUMENTS

| | | | |
|---|---|---|---|
| CN | 107835398 | A | 3/2018 |
| CN | 108259665 | A | 7/2018 |
| CN | 108312967 | A | 7/2018 |
| CN | 108337667 | A | 7/2018 |
| CN | 108845736 | A | 11/2018 |
| CN | 208188811 | U | 12/2018 |
| CN | 110310638 | A | 10/2019 |
| CN | 110733425 | A | 1/2020 |
| CN | 110908625 | A | 3/2020 |
| CN | 111541919 | A | 8/2020 |
| CN | 111625094 | A | 9/2020 |
| CN | 111634188 | A | 9/2020 |
| CN | 111645521 | A | 9/2020 |
| CN | 111666056 | A | 9/2020 |
| CN | 111736785 | A | 10/2020 |
| CN | 212181920 | U | 12/2020 |
| CN | 112331202 | A | 2/2021 |
| CN | 112394891 | A | 2/2021 |
| JP | H10282987 | A | 10/1998 |
| JP | 2005182168 | A | 7/2005 |
| JP | 2021103580 | A | 7/2021 |
| JP | 2021108187 | A | 7/2021 |
| JP | 2022516491 | A | 2/2022 |
| WO | WO2020135811 | A1 | 7/2020 |
| WO | WO2020193123 | A1 | 10/2020 |

OTHER PUBLICATIONS

Extended European Search Report of the parallel application EP22163481.9.
First Office Action of the parallel application JP2022-036892.
First Office Action of the priority application CN202110412533.0.
Notice of Allowance of the priority application CN202110412533.0.
"Research and Application of HD Video and Audio Wireless Screen Intelligent Terminal Based on IoT Architecture", Intelligent Architecture(智能建筑), vol. 04, Apr. 6, 2015, p. 76-80 (www.ib97.com).

* cited by examiner

METHOD AND APPARATUS FOR CONTROLLING DISPLAY IN A SCREEN PROJECTION SCENARIO, DEVICE AND PROGRAM PRODUCT

CROSS-REFERENCE TO RELATED APPLICATIONS

This application claims priority to Chinese Patent Application No. 202110412533.0, filed on Apr. 16, 2021 and entitled "METHOD AND APPARATUS FOR CONTROLLING DISPLAY IN A SCREEN PROJECTION SCENARIO, DEVICE AND PROGRAM PRODUCT", which is hereby incorporated by reference in its entirety.

TECHNICAL FIELD

The present application relates to technical fields of autonomous driving, Internet of Vehicles, intelligent voice, and screen projection in artificial intelligence and, in particular, to a method and apparatus for controlling display in a screen projection scenario, a device, a medium and a program product.

BACKGROUND

At present, smart rearview mirrors are installed on more and more vehicles. In addition to supporting the rear view function, the smart rearview mirror supports installation of a variety of applications, such as a map application, a voice application, a music application, etc., and displays content provided by these applications on the smart rearview mirror.

In order to facilitate a user in the vehicle to watch display content of the smart rearview mirror, the smart rearview mirror also supports a screen projection function. Exemplarily, a screen displayed by the smart rearview mirror may be projected onto a screen of a vehicle machine to facilitate the user in the vehicle to watch.

When a voice application is installed in the smart rearview mirror, the voice application may be frequently waked up. When the voice application is waked up, a page of a current application needs to be switched to a page of the voice application. And when the smart rearview mirror is in a projection state, frequent wake-up of the voice application results in a relatively large delay for the screens projected and displayed on the screen of the vehicle machine.

SUMMARY

The present application provides a method and apparatus for controlling display in a screen projection scenario, a device, a medium and a program product.

In a first aspect of the present application, a method for controlling display in a screen projection scenario is provided, which is applied to a smart rearview mirror of a vehicle, the smart rearview mirror is installed with a voice application and at least one non-voice application, the method includes:

receiving a voice interaction instruction corresponding to the voice application;

if a first page corresponding to a first application in the at least one non-voice application has been projected onto a screen of a terminal device, adding to-be-displayed content corresponding to the voice application to the first page to obtain a to-be-projected page corresponding to the first application; and projecting the to-be-projected page onto the screen of the terminal device.

In a second aspect of the present application, an apparatus for controlling display in a screen projection scenario is provided, which is applied to a smart rearview mirror of a vehicle, the smart rearview mirror is installed with a voice application and at least one non-voice application, the apparatus includes:

a receiving module, configured to receive a voice interaction instruction corresponding to the voice application;

a processing module, configured to if a first page corresponding to a first application in the at least one non-voice application has been projected onto a screen of a terminal device, add to-be-displayed content corresponding to the voice application to the first page to obtain a to-be-projected page corresponding to the first application; and a screen-projecting module, configured to project the to-be-projected page onto the screen of the terminal device.

In a third aspect of the present application, an electronic device is provided, including:

at least one processor; and a memory communicatively connected to the at least one processor; where the memory is stored with instructions executable by the at least one processor, and the instructions are executed by the at least one processor to enable the at least one processor to execute the method described in the first aspect.

In a fourth aspect of the present application, a non-transitory computer readable storage medium stored with computer instructions is provided, where the computer instructions are configured to enable a computer to execute the method described in the first aspect.

In a fifth aspect of the present application, a computer program product is provided, where the computer program product includes a computer program, the computer program is stored in a readable storage medium, at least one processor of an electronic device can read the computer program from the readable storage medium, and the at least one processor executes the computer program to enable the electronic device to execute the method described in the first aspect.

In a sixth aspect of the present application, a smart rearview mirror is provided, which includes the electronic device described in the third aspect.

It should be understood that the content described in this section is not intended to point out the key or important features of embodiments of the present application, nor to limit the scope of the present application. Other features of the present application will be easily understood through the following description.

BRIEF DESCRIPTION OF DRAWINGS

The drawings are used for better understanding of the present scheme and do not constitute a limitation of the present application. Among them.

DESCRIPTION OF EMBODIMENTS

The following describes exemplary embodiments of the present application with reference to the accompanying drawings, which includes various details of the embodiments of the present application to facilitate understanding, and the described embodiments are merely exemplary. Therefore, persons of ordinary skill in the art should know that various changes and modifications can be made to the embodiments described herein without departing from the scope and spirit of the embodiments of the present application. Also, for clarity and conciseness, descriptions of well-known functions and structures are omitted in the following description.

The present application provides a method and apparatus for controlling display in a screen projection scenario, a device and a program product, which are applied to the field of autonomous driving, Internet of Vehicles, intelligent voice, and screen projection in artificial intelligence, to reduce a delay in displaying images projected on the screen.

At present, smart rearview mirrors are installed on more and more vehicles. The smart rearview mirror has an independent operating system and independent operating space, a user may install various applications in the smart rearview mirror, and the smart rearview mirror can be connected to a wired network, and can further provide functions, such as driving recording, vehicle positioning, a reminder of electronic speed measurement, a reversing visibility, a real-time online audio and video entertainment and so on.

Generally, smart rearview mirrors can be installed with a variety of applications, such as a map application, a voice application, a music application, etc., and displays content provided by these applications on the smart rearview mirror. In order to facilitate a driver to watch the display content of the smart rearview mirror during driving, the smart rearview mirror also supports a screen projection function. In other words, an image displayed by the smart rearview mirror may be projected onto a screen of a terminal device. Among them, the terminal device here may be a vehicle machine in the vehicle or a terminal device of a user. The vehicle machine in the embodiments may be arranged in a center console and a screen of the vehicle is set on a surface of the center console to display various information to the user. The smart rearview mirror may be connected to the vehicle machine via a wired connection, such as a universal serial bus (Universal Serial Bus, USB). Alternatively, the smart rearview mirror may be connected to the vehicle machine via a wireless connection, such as a Bluetooth, or connected via a wireless fidelity (Wireless Fidelity, Wi-Fi) connection. The terminal device of the user in the embodiments may include, but is not limited to, a mobile phone, a personal digital assistant (Personal Digital Assistant, PDA), a tablet computer, a portable device (for example, a portable computer, a pocket computer, or a handheld computer), etc.

Figure 1:
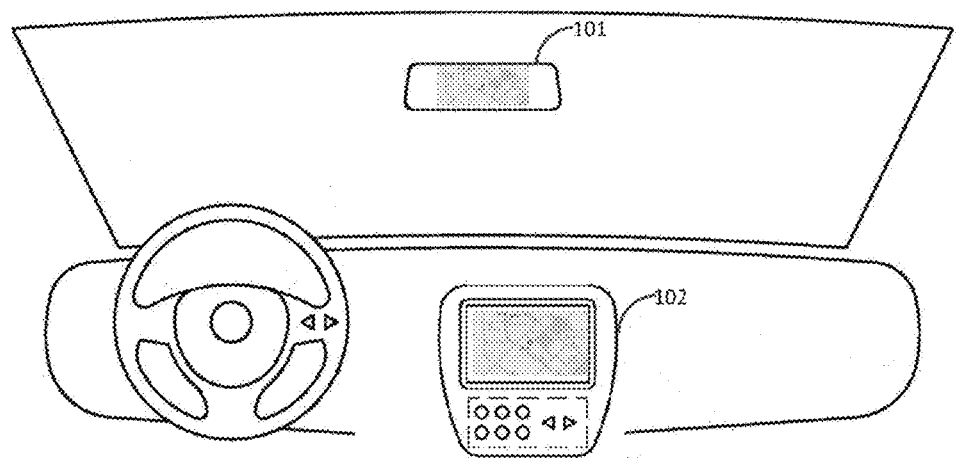
FIG. 1 is a schematic diagram of a screen projection scenario of a smart rearview mirror provided by an embodiment of the application.

With reference to FIG. 1, an example is taken where a screen of the smart rearview mirror is projected to a screen of the vehicle machine for illustration purpose.

FIG. 1 is a schematic diagram of a screen projection scenario of a smart rearview mirror provided by an embodiment of the application. As shown in FIG. 1, the smart rearview mirror 101 is arranged in a vehicle, the smart rearview mirror 101 may be installed inside the vehicle near a center of a windshield. The image displayed by the smart rearview mirror 101 is projected onto a screen of the vehicle machine 102, so that a user in the vehicle may watch the content provided by the currently running application of the smart rearview mirror through the screen of the vehicle machine 102. It should be noted that in practical applications, when the displayed image of the smart rearview mirror 101 is projected onto the screen of the vehicle machine 102, the smart rearview mirror 101 may display the image synchronously, or the smart rearview mirror 101 may be set in a screen-off state, which is not limited in this embodiment.

In the embodiments of the present application, for the convenience of description, an application that is waked by voice and supports user voice interaction is referred to as a voice application. The voice application may include a voice assistant application, for example.

When a voice application is installed in the smart rearview mirror, the voice application may be waked up. When the voice application is waked up, the current displayed image needs to be switched to an image of the voice application. Among them, the current displayed image refers to a displayed image of an application currently running in the foreground of the smart rearview mirror. It should be understood that the current displayed image may be a page of a system desktop of the smart rearview mirror, or may be a page of any non-voice application installed on the smart rearview mirror.

Figure 2:
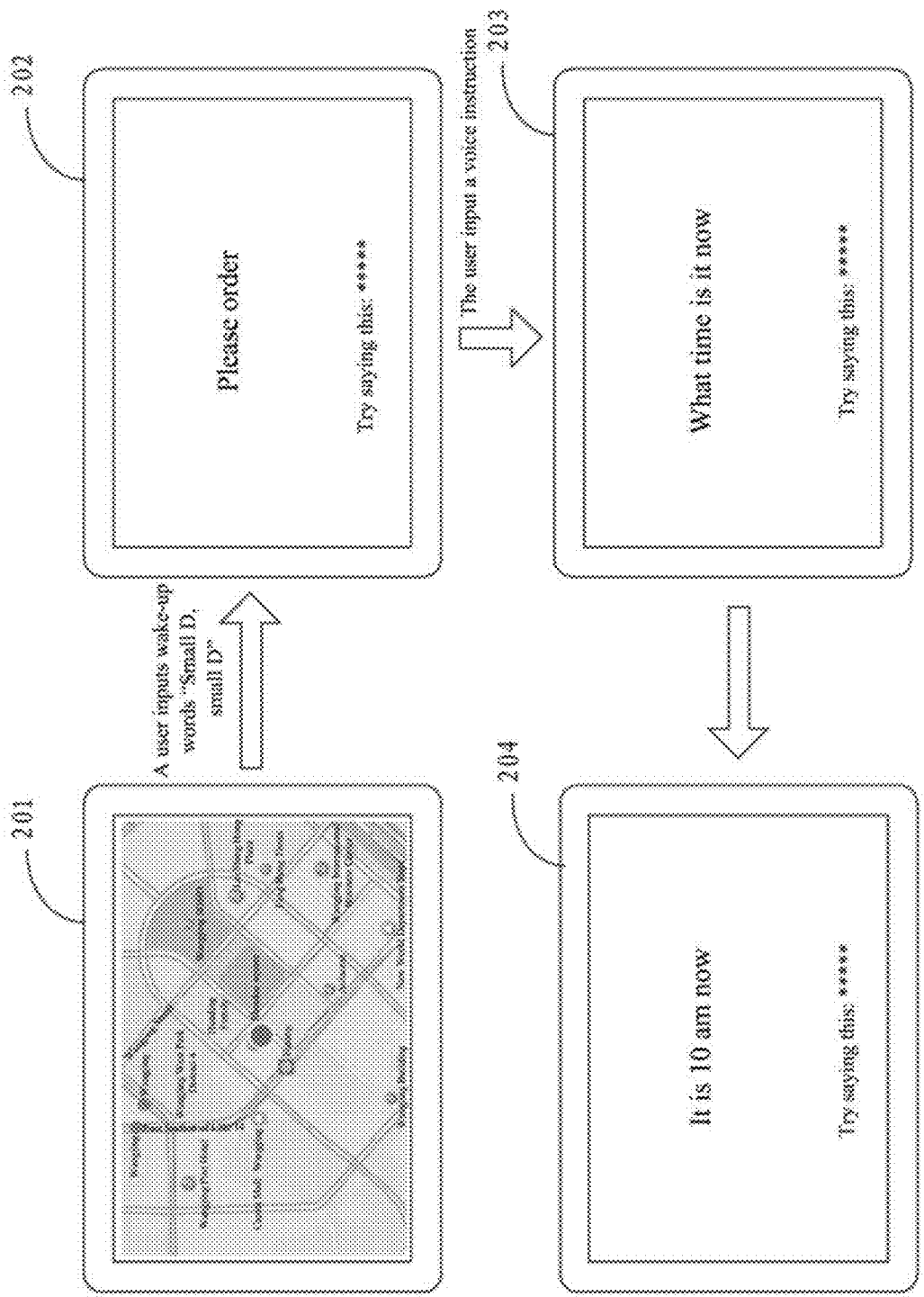
FIG. 2 is a set of schematic diagrams showing changes of interfaces.

FIG. 2 is a set of schematic diagrams showing changes of interfaces. The interface shown in FIG. 2 may be a display interface of a smart rearview mirror, or may be an interface displayed by the vehicle machine which is a projection of a screen of the smart rearview mirror. As shown in an interface 201 in FIG. 2, assuming that the application currently running in the foreground of the smart rearview mirror is a map application, and in the projection mode, a page of the map application is displayed on the smart rearview mirror or the screen of the vehicle machine. In this scenario, if a user inputs wake-up words "Small D, small D", a voice application in the smart rearview mirror is waked up. Referring to the interface 202 in FIG. 2, a page displayed on the smart rearview mirror and/or the screen of the vehicle machine is switched to a page of the voice application. In other words, the map application in the smart rearview mirror is switched to run in the background, and the voice application is switched to run in the foreground. Referring to the interface 203 in FIG. 2, if the user inputs a voice instruction "What time is it now", the voice instruction is displayed on the page of the voice application. Furthermore, referring to the interface 204 in FIG. 2, after performing voice recognition and semantic parsing processing on the voice instruction, the smart rearview mirror generates reply information "It is 10 am now" corresponding to the voice instruction, and displays the reply information on the page of the voice application.

Since a voice application performs interaction by means of voice wake-up, in practical applications, the voice application may be frequently waked up. When the smart rearview mirror is in a projection state, the frequent wake-up of the voice application results in a relatively large delay in images displayed on the screen of the vehicle machine through screen projection.

The inventor of the present application analyzed the projection principle of the smart rearview mirror and found the reason for the delay in displaying the image projected on the screen. The following will be described with reference to FIG. 3.

Figure 3:
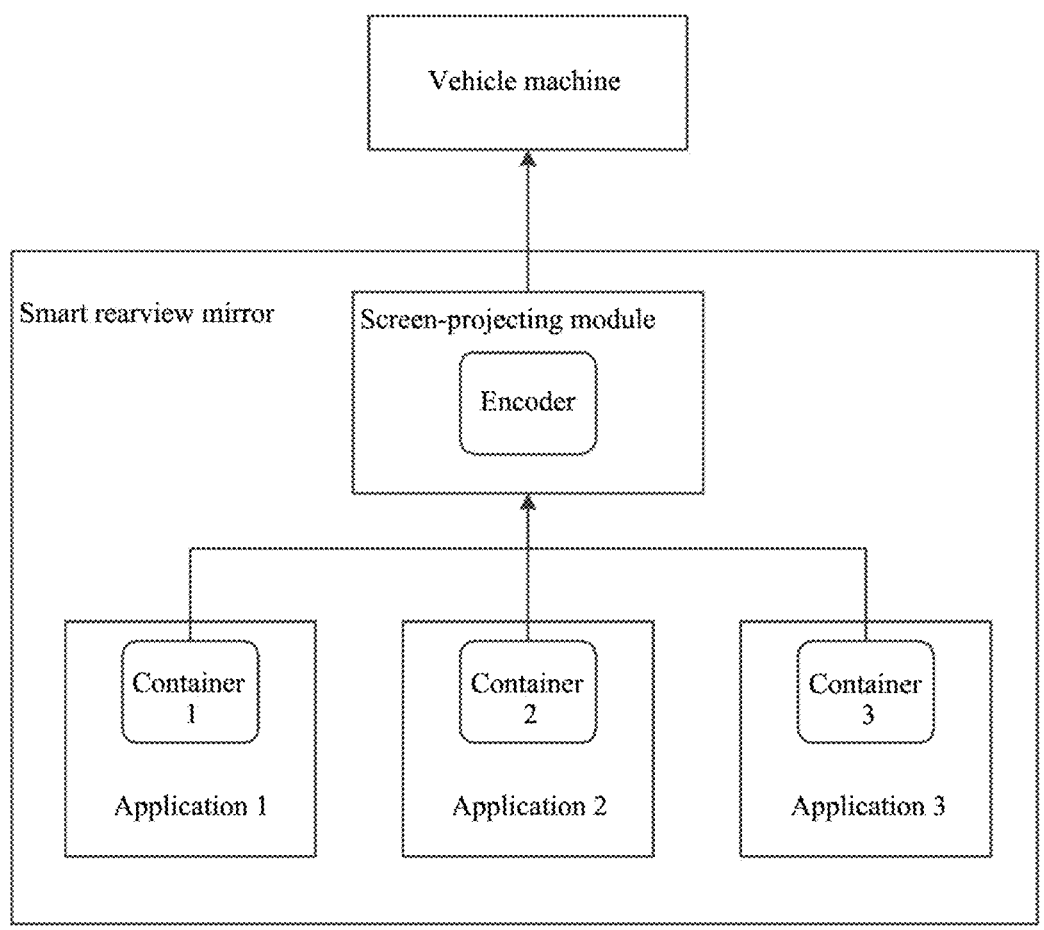
FIG. 3 is a schematic diagram of a screen projection process of a smart rearview mirror.

FIG. 3 is a schematic diagram of a screen projection process of a smart rearview mirror. As shown in FIG. 3, assuming that multiple applications are installed in the smart rearview mirror, each application corresponds to a container, and different applications correspond to different containers. The container corresponding to each application is used to store content of to-be-projected page corresponding to the application. Exemplarily, assuming that the application currently running in the foreground of the smart rearview mirror is an application 1, then the application 1 puts the content of its to-be-projected page into a container 1. Assuming that the application currently running in the foreground of the smart rearview mirror is an application 2, then the application 2 puts the content of its to-be-projected page into a container 2.

Continuing to refer to FIG. 3, the smart rearview mirror also includes a screen-projecting module. An encoder is deployed in the screen-projecting module. The screen-projecting module is used to retrieve the content of the to-be-projected page from the container corresponding to each application, and encode the content of the to-be-projected page using an encoder to obtain an encoding result. The screen-projecting module further sends the encoding result to the vehicle machine. The vehicle machine decodes the received encoding result, and renders and displays the to-be-projected page according to the decoded data.

Since different applications correspond to different containers, when the application running in the foreground of the smart rearview mirror is switched, the screen-projecting module has to switch the corresponding container. When the container is switched, the screen-projecting module needs to reset the encoder, that is, reinitialize the encoder.

Figure 4:
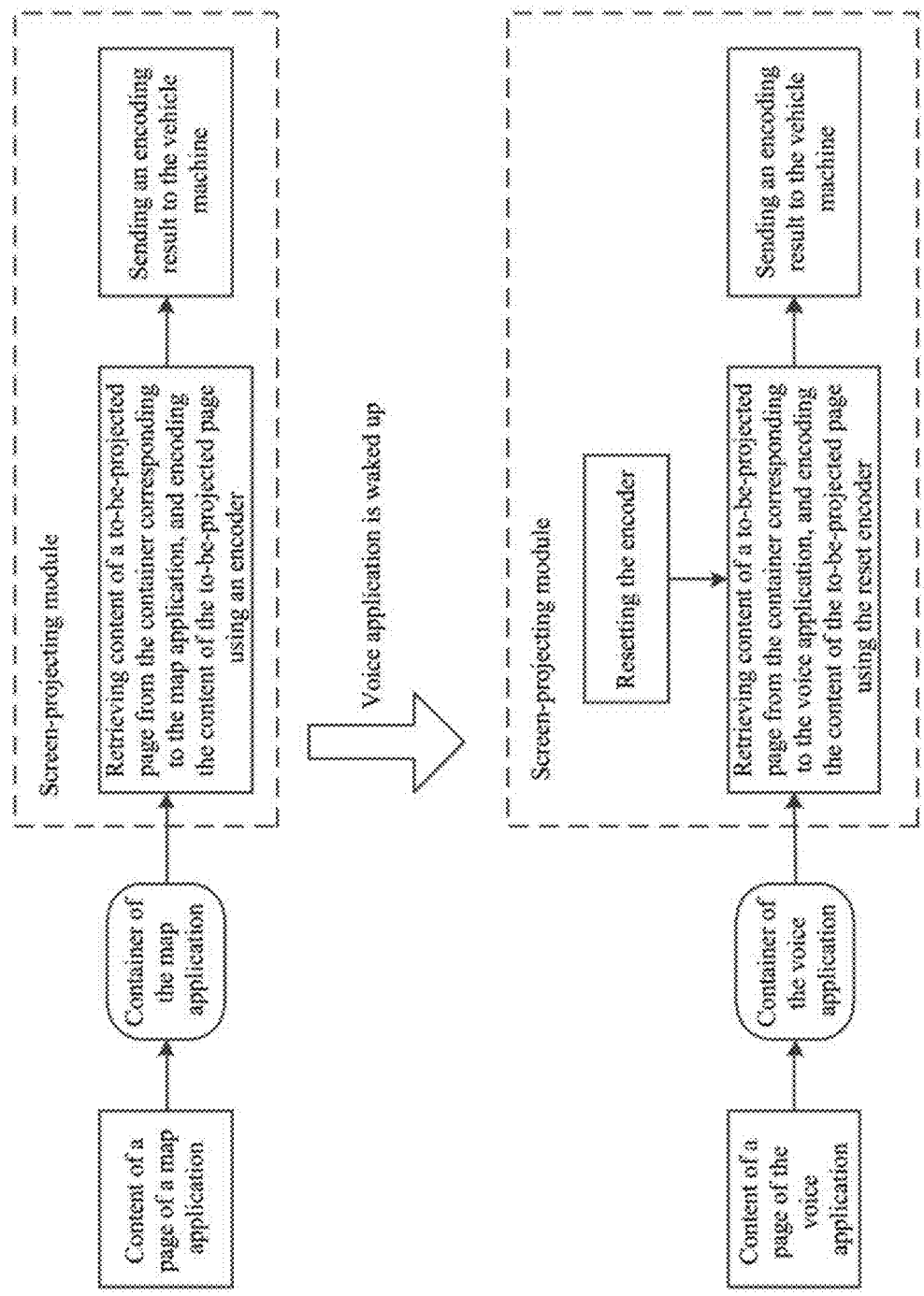
FIG. 4 is a schematic diagram of a process of controlling display in a screen projection scenario.

FIG. 4 is a schematic diagram of a process of controlling display in a screen projection scenario. For example, assuming that a map application is running in the foreground of the smart rearview mirror, the process of projecting a page of the map application to the screen of the vehicle machine is as follows: the map application puts content of a to-be-projected page into a container corresponding to the map application. The screen-projecting module retrieves the content of the to-be-projected page from the container corresponding to the map application, and encode the content of the to-be-projected page using the encoder to obtain an encoding result, and sends the encoding result to the vehicle machine.

Continuing to refer to FIG. 4, when the smart rearview mirror receives a wake-up instruction from a voice application, the voice application is switched to a foreground application, and a currently displayed page is switched to a page of the voice application. The projection process at this time is as follows: the voice application puts content of a to-be-projected page into a container corresponding to the voice application. The screen-projecting module resets the encoder due to a change of the containers. The screen-projecting module retrieves the content of the to-be-projected page from the container corresponding to the voice application, encodes the content of the to-be-projected page using the reset encoder to obtain an encoding result, and sends the encoding result to the vehicle machine.

It can be seen from FIG. 4 that in the screen projection scenario, when the voice application is waked up, the encoder of the screen-projecting module needs to be reset. Since a voice application performs interaction by means of voice wake-up, in practical applications, the voice application is frequently waked up. Therefore, a large number of operations for resetting the encoder are required in the screen projection scenario, resulting in a relatively large delay in the screen projection display of the voice application on the vehicle machine, which makes that the user mistakenly believes that a response speed of the voice application is slow, and reduces the voice interaction experience of the user. Furthermore, since the text-to-speech (Text To Speech, TTS) broadcast of the voice application is related to the display of a page, the slow display of the page also further causes the delay of the TTS broadcast.

The inventor of the present application proposes the inventive concept of the present application based on the above analysis: during the interaction between the user and the voice application, by adding to-be-displayed content of the voice application to a page of the application currently running in the foreground, the switching of applications running in the foreground is avoided as much as possible, thereby avoiding the problem of display delay of the projected page on the vehicle machine side.

The technical solution of the present application will be described in detail below in conjunction with several specific embodiments. The following embodiments may be combined with each other, and descriptions of the same or similar content may not be repeated in some embodiments.

Figure 5:
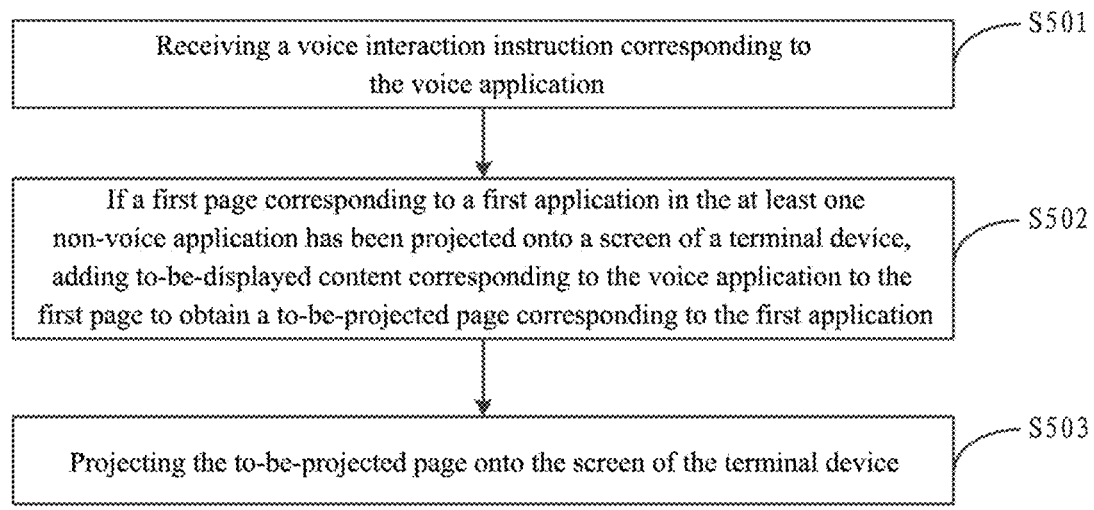
FIG. 5 is a schematic flowchart of a method for controlling display in a screen projection scenario provided by an embodiment of the present application.

FIG. 5 is a schematic flowchart of a method for controlling display in a screen projection scenario provided by an embodiment of the present application. The method of this embodiment can be executed by a smart rearview mirror. Among them, the smart rearview mirror is installed with a voice application and at least one non-voice application. Exemplarily, the voice application may be a voice assistant application, and the non-voice application may include: a map application, a music application, a news application, and so on.

As shown in FIG. 5, the method of this embodiment includes:

S501: receiving a voice interaction instruction corresponding to the voice application.

In this embodiment, the voice interaction instruction may be a wake-up instruction for waking up a voice application. Exemplarily, the smart rearview mirror detects a voice, recognizes the detected voice, and determines whether it is a wake-up instruction corresponding to the voice application.

In this embodiment, the voice interaction instruction may also be a request instruction for requesting the voice application to perform a preset operation. Exemplarily, the smart rearview mirror continuously performs voice detection within a preset time period after receives the wake-up instruction corresponding to the voice application to detect the request instruction input by the user.

S502: if a first page corresponding to a first application in the at least one non-voice application has been projected onto a screen of a terminal device, adding to-be-displayed content corresponding to the voice application to the first page to obtain a to-be-projected page corresponding to the first application.

Among them, the first application may be any application in the at least one non-voice application. The terminal device in this embodiment may be a vehicle machine or a terminal device of the user.

In this embodiment, when the received voice interaction instructions are different, the to-be-displayed content corresponding to the voice application may also be different. In an example, when the received voice interaction instruction is a wake-up instruction, the to-be-displayed content corresponding to the voice application may be reply information corresponding to the wake-up instruction. For example, when the user inputs a wake-up instruction "Small D, small D", the voice application may display the reply information such as "I'm here", "I'm coming", and "Please order".

When the received voice interaction instruction is a request instruction, the to-be-displayed content corresponding to the voice application may include the request instruction pe se, and may also include reply information corresponding to the request instruction. For example, if the user inputs a voice instruction "What time is it now", the voice application may display "What time is it now" and the reply information corresponding to the voice instruction "It is 10 am now".

In this embodiment, S501 and S502 may also be described as: when the first application is running in the foreground of the smart rearview mirror, and the first page corresponding to the first application has been projected to the screen of the terminal device, if the voice interaction instruction corresponding to the voice application is received, adding the to-be-displayed content corresponding to the voice application to the first page to obtain the to-be-projected page corresponding to the first application.

It should be understood that, in this embodiment, when the user interacts with the voice application, the to-be-displayed content of the voice application is displayed through the page of the first application currently running in the foreground rather than switching the voice application to a foreground application. In other words, after the voice application is waked up, the voice application is still running in the background, and the first application is still running in the foreground. In this way, switching of applications running in the foreground is avoided, and there is no need to reset the encoder.

S503: projecting the to-be-projected page onto the screen of the terminal device.

It should be understood that the to-be-projected screen includes the display content corresponding to the voice application. Therefore, after the to-be-projected page is projected to the terminal device, the user can see the display content corresponding to the voice application on the screen of the terminal device, thereby preventing from affecting the interaction between the user and the voice application.

The method for controlling display in a screen projection scenario provided in this embodiment includes: receiving a voice interaction instruction corresponding to a voice application; if a first page corresponding to a first application in at least one non-voice application has been projected onto a screen of a terminal device, adding to-be-displayed content corresponding to the voice application to the first page to obtain a to-be-projected page corresponding to the first application; and projecting the to-be-projected page onto the screen of the terminal device. It can be seen that, in this embodiment, when a user interacts with the voice application, the page of the currently running first application is used to display the to-be-displayed content of the voice application, thus avoiding switching of applications running in the foreground, so that there is no need to reset the encoder, thereby preventing the problem of a delay in the image projected on the screen.

On the basis of the foregoing embodiment, the process of controlling projection display in the embodiment of the present application is described below with a specific example.

Figure 6:
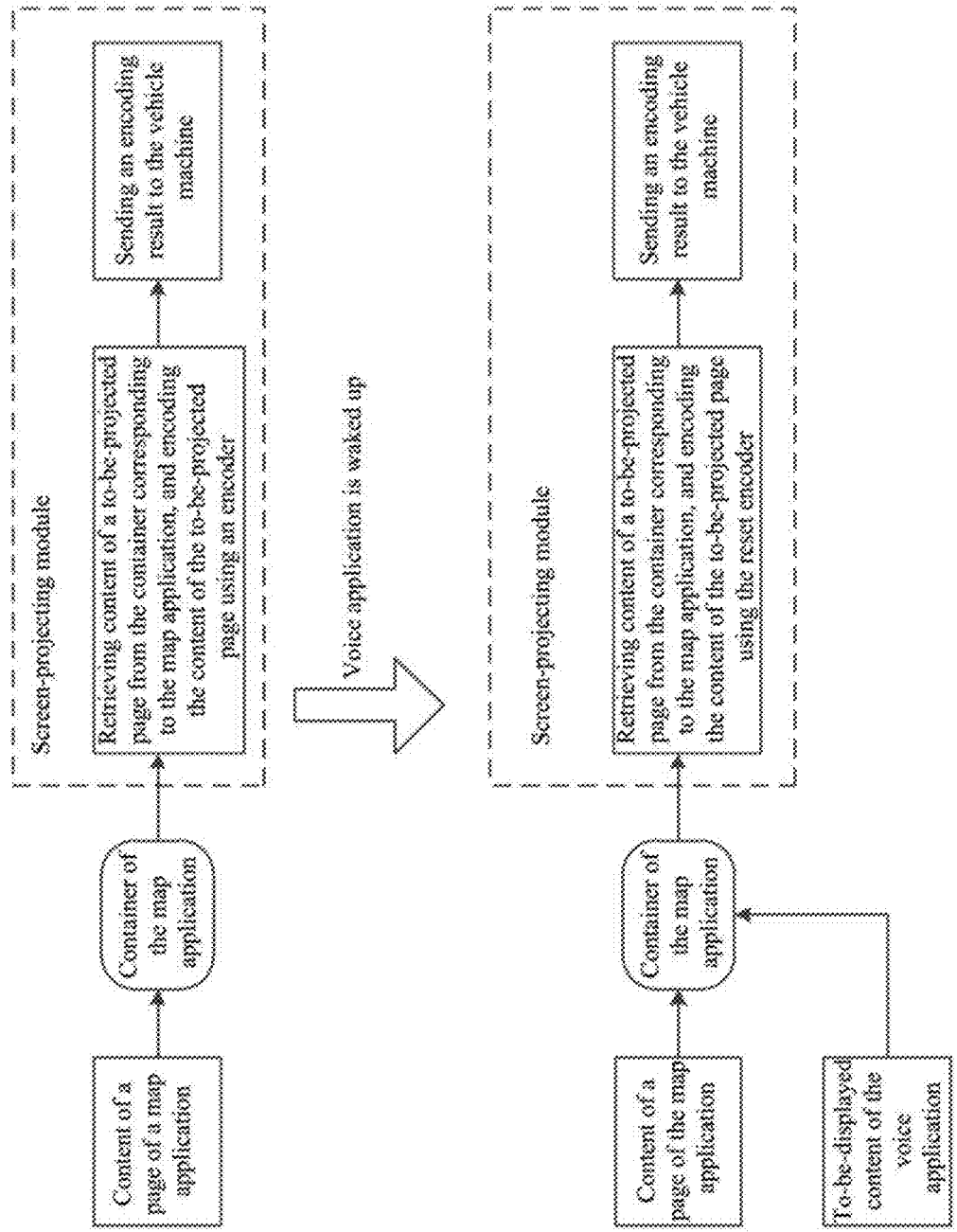
FIG. 6 is a schematic diagram of a process of controlling display in a screen projection scenario provided by an embodiment of the present application.

FIG. 6 is a schematic diagram of a process of controlling display in a screen projection scenario provided by an embodiment of the present application. As shown in FIG. 6, assuming that a map application is running in the foreground of the smart rearview mirror, the process of projecting a page of the map application to the screen of the vehicle machine is as follows: the map application puts content of a to-be-projected page into a container corresponding to the map application. The screen-projecting module retrieves the content of the to-be-projected page from the container corresponding to the map application, and encode the content of the to-be-projected page using an encoder to obtain an encoding result, and sends the encoding result to the vehicle machine.

Continuing to refer to FIG. 6, when receiving a wake-up instruction from the voice application, the smart rearview mirror acquires the container corresponding to the map application, and adds the to-be-displayed content corresponding to the voice application to the container corresponding to the map application. In this way, it is realized that the to-be-displayed content of the voice application is added to the page of the map application, and the to-be-projected page of the map application is obtained. The to-be-projected page at this time includes not only the content of a map page, but also the to-be-displayed content corresponding to the voice application. Furthermore, the screen-projecting module retrieves the content of the to-be-projected page from the container corresponding to the map application, and encodes the content of the to-be-projected page using the encoder to obtain an encoding result. It should be understood that since the container has not been switched, the encoder at this time does not need to be reset. The screen-projecting module sends the encoding result to the vehicle machine.

As can be seen from FIG. 6, in this embodiment, during the interaction between the user and the voice application, since the to-be-displayed content of the voice application is added to the container of the map application, switching of the container is thus avoided, so that there is no need to reset the encoder, thereby preventing the problem of a delay in the image projected on the screen.

Figure 7:
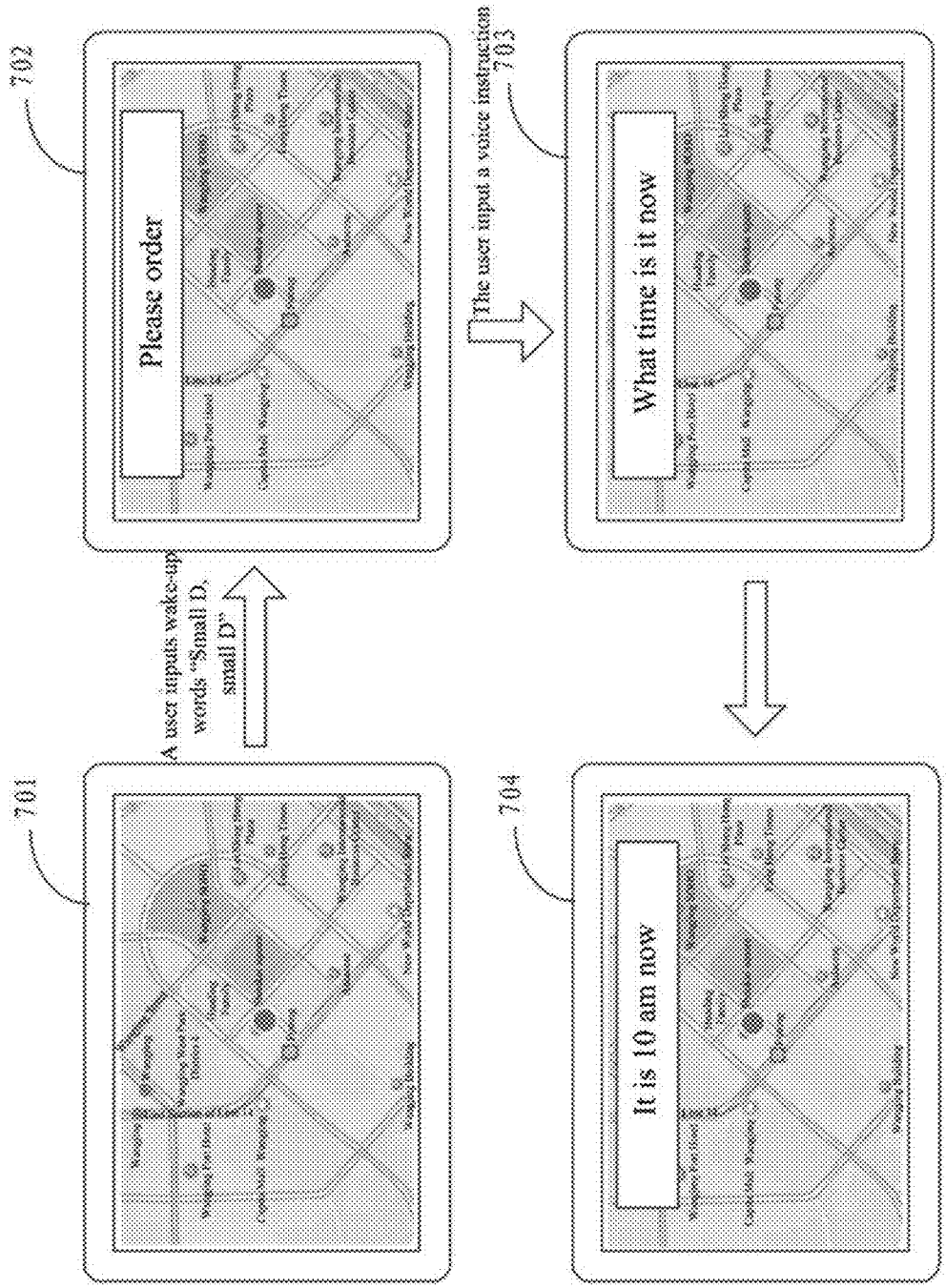
FIG. 7 is a set of schematic diagrams showing changes of interfaces provided by an embodiment of the present application.

FIG. 7 is a set of schematic diagrams showing changes of interfaces provided by an embodiment of the present application. As shown in an interface 701 in FIG. 7, assuming that the application currently running in the foreground of the smart rearview mirror is a map application. In the projection mode, a page of the map application is displayed on the smart rearview mirror or the screen of the vehicle machine. When the user inputs a wake-up instruction to wake up the voice application (for example, the user inputs wake-up words "Small D, small D"), a target area may be determined on a map page, and reply information corresponding to the wake-up instruction (for example, "I'm here", "Please order", "I am", etc.) is added to the target area, thus the interface 702 as shown in FIG. 7 is obtained. At the same time, the voice application broadcasts the above reply information in the background.

Furthermore, when the user inputs a request instruction for requesting the voice application to perform a preset operation, the to-be-displayed content of the voice application is displayed in the above mentioned target area. In an example, in a process of receiving the request instruction, at least part of the content of the request instruction received is added to the above mentioned target area. As shown in an interface 703 in FIG. 7, the request instruction "What time is it now" input by the user is displayed in the target area.

In another example, after the receiving of the request instruction is completed, reply information corresponding to the request instruction is added to the above mentioned target area. As shown in an interface 704 in FIG. 7, the reply information "It is 10 am now" is displayed in the target area. At the same time, the voice application broadcasts the above reply information in the background through voice.

It should be noted that when the reply information of the request instruction is displayed, the reply information may be displayed in addition to the displayed request instruction, and the request instruction may also be replaced with the reply information, which is not limited in this embodiment.

Figure 8A:
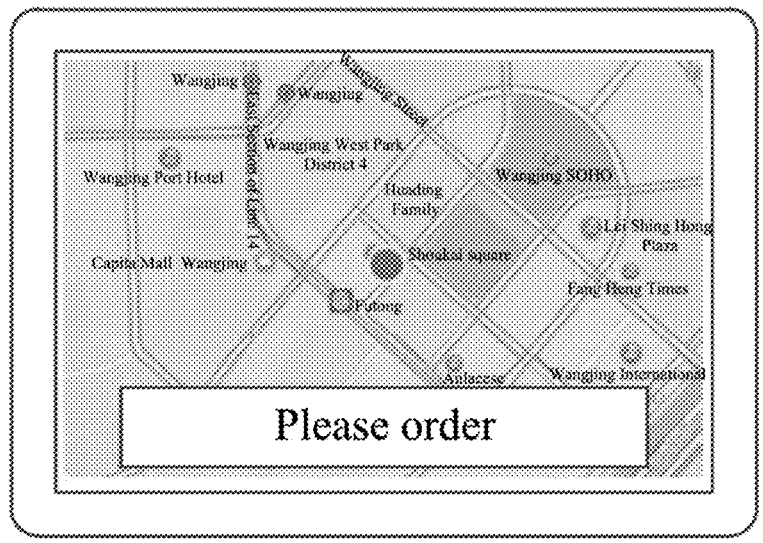
FIG. 8A is a schematic diagram of an interface provided by an embodiment of the present application.
Figure 8B:
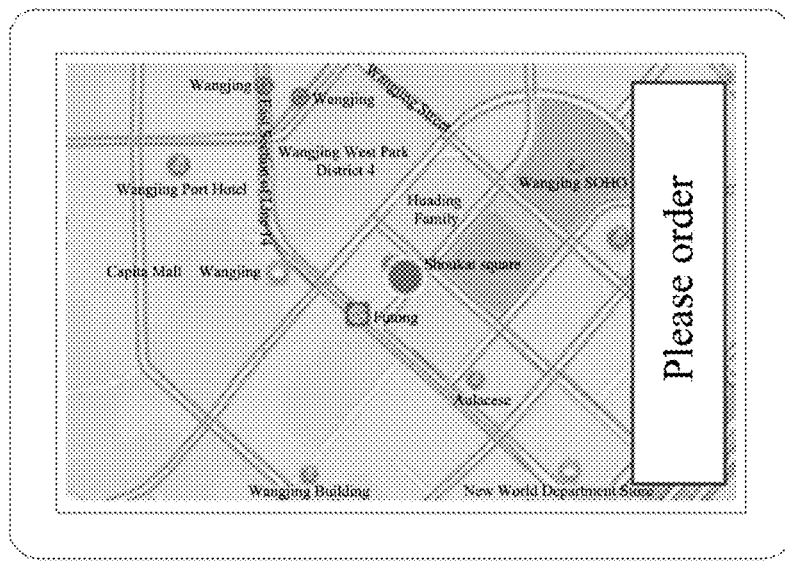
FIG. 8B is a schematic diagram of another interface provided by an embodiment of the present application.

It should be understood that the target area in this embodiment may be located in any area on the map page, which is not limited in this embodiment. FIG. 7 illustrates the situation that the target area is located at the top of the map page. In practical applications, the target area may also be located at the bottom of the map page, or on the left or right side. FIG. 8A is a schematic diagram of an interface provided by an embodiment of the present application. In the example of the interface in FIG. 8A, the target area is located at the bottom of the map page. FIG. 8B is a schematic diagram of another interface provided by an embodiment of the present application. In the example of the interface in FIG. 8B, the target area is located on the right side of the map page.

On the basis of the foregoing embodiment, in some scenarios, after the voice application is waked up, it may enter some more complex interactive scenarios. For example, the request instruction input by the user indicates to query certain content, and a query result of the content is relatively complicated, and the query result may not be fully displayed through the above mentioned target area. In this scenario, it may still be necessary to switch the voice application to the foreground application, and the result will be queried through the full-screen page of the voice application. The following will be described with reference to FIG. 9.

Figure 9:
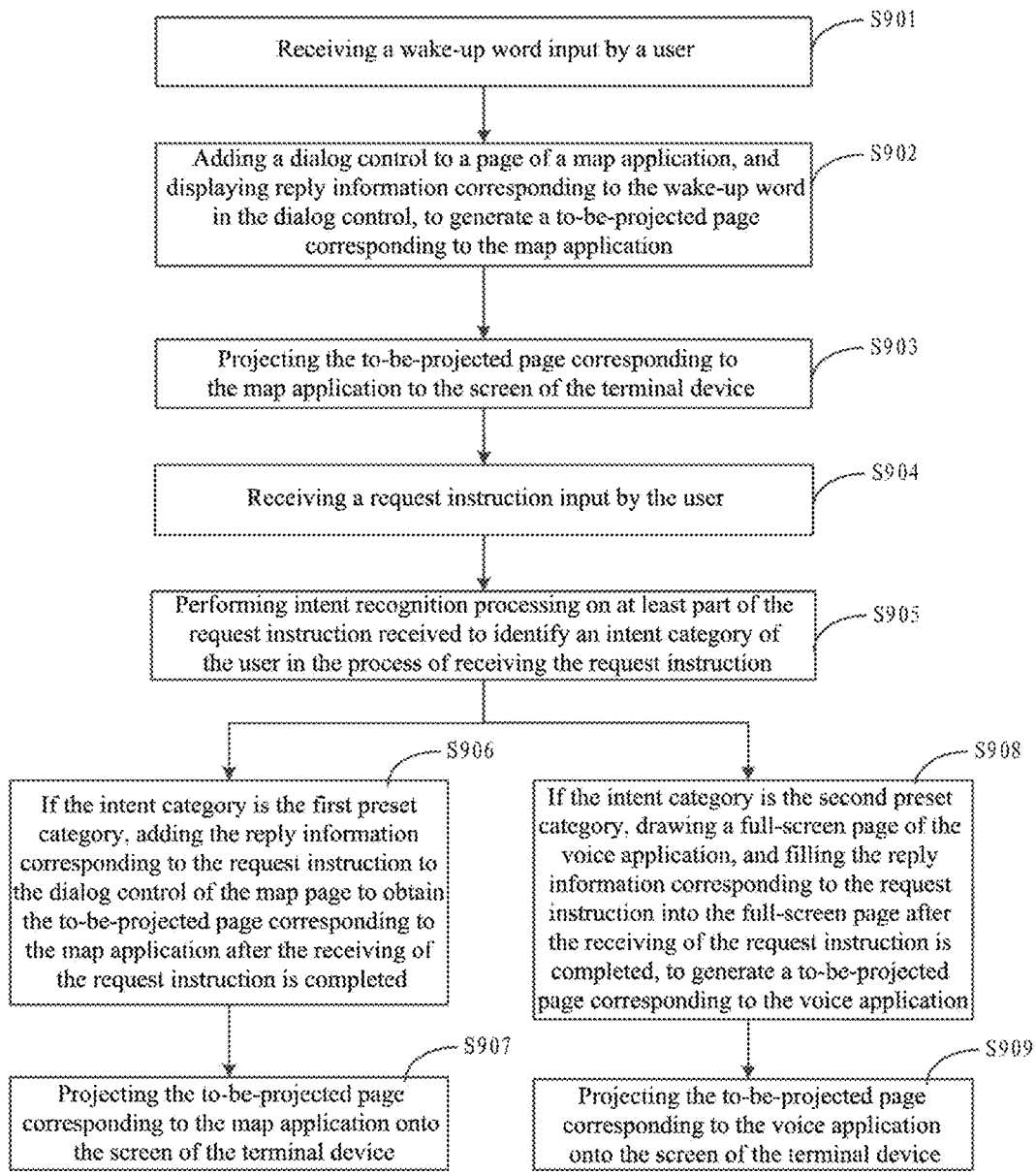
FIG. 9 is a schematic flowchart of another method for controlling display in a screen projection scenario provided by an embodiment of the present application.

FIG. 9 is a schematic flowchart of another method for controlling display in a screen projection scenario provided by an embodiment of the present application. In this embodiment, assuming that an application currently running in the foreground of the smart rearview mirror is a map application, and a displayed image of the smart rearview mirror is projected onto a screen of a vehicle machine. As shown in FIG. 9, the method of this embodiment includes:

S901: receiving a wake-up word input by a user.

For example, receiving a wake-up word "Small D small D" input by a user.

S902: adding a dialog control to a page of a map application, and displaying reply information corresponding to the wake-up word in the dialog control, to generate a to-be-projected page corresponding to the map application.

For example, as shown in the interface 702 in FIG. 7, the dialog control is added to the top of the current page of the map application, and the reply information "Please order" is displayed.

It should be understood that, for the implementation of S902, reference may be made to the detailed description of the foregoing embodiments. The map page on which the dialog control is added is projected onto the screen of the terminal device. There is no need to reset the encoder during the projection process.

S903: projecting the to-be-projected page corresponding to the map application to the screen of the terminal device.

S904: receiving a request instruction input by the user.

S905: performing intent recognition processing on at least part of the request instruction received to identify an intent category of the user in the process of receiving the request instruction.

In this embodiment, in the process of receiving the request instruction by the smart rearview mirror, voice recognition is performed on a currently received incomplete voice instruction, that is, voice recognition is performed while receiving the request instruction, instead of performing the recognition until the receiving of the request instruction is completed. Intent recognition processing is performed on a result of the voice recognition to identify the intent category of the user. It should be understood that in this embodiment, the intent category of the user has been identified before the receiving of the request instruction is completed.

In this embodiment, the intent category is divided into a first preset category and a second preset category. When the intent category of the user is the first preset category, it means that reply information corresponding to the request instruction of the user is relatively simple, and the reply information corresponding to the request instruction may be displayed through the dialog control. When the intent category of the user is the second preset category, it means that the reply information corresponding to the request instruction of the user is relatively complicated, and the reply information corresponding to the request instruction cannot be fully displayed through the dialog control, a full-screen page of the voice application therefore is needed for displaying the reply information of the request instruction.

In an implementation, an offline semantic parsing may be used for intent recognition processing, which can increase a speed of intent recognition processing. The offline semantic parsing here can be understood as fast and simple semantic parsing, which is different from normal semantic parsing and is simply intended to predict the intent category of the user.

In an implementation, the intent category of the user may be determined by identifying a keyword in the request instruction. For example, when the request instruction includes a first type of keyword, the intent category of the user is determined to be the first preset category; while when the request instruction includes a second type of keyword, the intent category of the user is determined to be the second preset category.

S906: if the intent category is the first preset category, adding the reply information corresponding to the request instruction to the dialog control of the map page to obtain the to-be-projected page corresponding to the map application after the receiving of the request instruction is completed.

Specifically, after the receiving of the request instruction is completed, the semantic parsing is performed on the request instruction to obtain a semantic parsing result; the reply information corresponding to the request instruction is generated according to the semantic parsing result; and the reply information corresponding to the request instruction is added to the target area, thus the to-be-projected page corresponding to the map application is obtained.

S907: projecting the to-be-projected page corresponding to the map application onto the screen of the terminal device.

It should be understood that, for the screen projection process of S907, reference can be made to the detailed description of the foregoing embodiments, which will not be repeated here. It should be noted that the screen-projecting module in S907 acquires the content of the to-be-projected page from the container corresponding to the map application, and performs encoding processing using an encoder. Since there is no container switching involved, there is no need to reset the encoder.

S908: if the intent category is the second preset category, drawing a full-screen page of the voice application, and filling the reply information corresponding to the request instruction into the full-screen page after the receiving of the request instruction is completed, to generate a to-be-projected page corresponding to the voice application.

Specifically, after the receiving of the request instruction is completed, the semantic parsing is performed on the request instruction to obtain a semantic parsing result; the reply information corresponding to the request instruction is generated according to the semantic parsing result; and the corresponding reply information is filled into the full-screen page.

It should be understood that since the intent category of the user has been identified before the receiving of the request instruction is completed in this embodiment, therefore, in the case where the intent category of the user is determined to be the second preset category, it is possible to draw the full-screen page of the voice application in advance by using a time difference between the determination of the intent category and the completion of the semantic parsing of the complete request instruction. After the receiving of the request instruction is completed and the reply information of the request instruction is generated according to the semantic parsing result of the request instruction, the reply information may be directly filled into the drawn full-screen page. In this way, it is equivalent to changing the two operations (namely semantic parsing and drawing of a full-screen page) that were originally performed in series to be performed in parallel, thus increasing a response speed of the voice application.

S909: projecting the to-be-projected page corresponding to the voice application onto the screen of the terminal device.

It should be understood that the difference between S909 and S907 is that: in S907, the screen-projecting module acquires the content of the to-be-projected page from the container corresponding to the map application, and performs encoding processing on the content of the to-be-projected page using the encoder. Since there is no container switching involved, there is no need to reset the encoder. In S909, the screen-projecting module acquires the content of the to-be-projected page from the container corresponding to the voice application. Since container switching is involved, the encoder needs to be reset, and the reset encoder is used to encode the content of the to-be-projected page.

It should be understood that while executing S907 or S909, corresponding voice broadcast or a corresponding operation may also be executed according to the semantic parsing result of the request instruction.

In this embodiment, in a process of receiving a request instruction, an intent category of the user is obtained by predicting at least part of content of the request instruction received, the voice application is switched to the foreground when the intention category is a second preset category, and a full-screen page of the voice application is drawn for displaying the reply information of the request instruction. Otherwise, the interaction between the user and the voice application is carried out in a dialog control added in a page of an application which is currently in the foreground, thereby avoiding frequent reset operations for an encoder and reducing the delay in displaying through screen projection.

Figure 10:
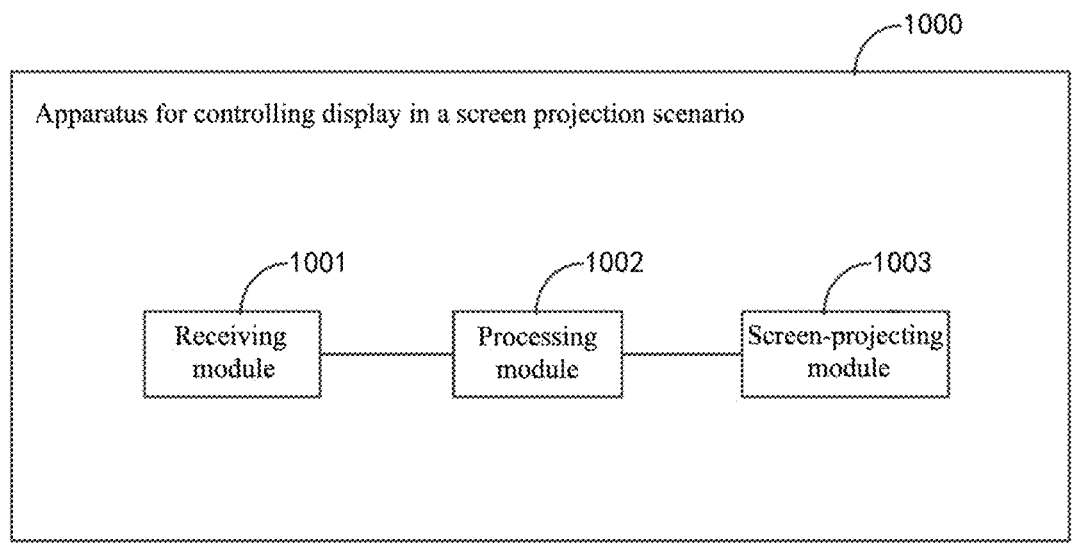
FIG. 10 is a schematic structural diagram of an apparatus for controlling display in a screen projection scenario provided by an embodiment of the present application.

FIG. 10 is a schematic structural diagram of an apparatus for controlling display in a screen projection scenario provided by an embodiment of the present application. The apparatus in this embodiment may be in a form of software and/or hardware. The apparatus may be applied to a smart rearview mirror, in which a voice application and at least one non-voice application are installed.

As shown in FIG. 10, the apparatus for controlling display in the screen projection scenario 1000 in this embodiment includes: a receiving module 1001, a processing module 1002, and a screen-projecting module 1003. Among them, the receiving module 1001 is configured to receive a voice interaction instruction corresponding to the voice application;

the processing module 1002 is configured to if a first page corresponding to a first application in the at least one non-voice application has been projected onto a screen of a terminal device, add to-be-displayed content corresponding to the voice application to the first page to obtain a to-be-projected page corresponding to the first application; and the screen-projecting module 1003 is used to project the to-be-projected page onto the screen of the terminal device.

In a possible implementation, each application corresponds to a container and different applications correspond to different containers, and the container corresponding to each application is used to store content of a to-be-projected page corresponding to the application; and the processing module 1002 is specifically configured to:

acquire a container corresponding to the first application, where the container corresponding to the first application includes content of the first page; and add the to-be-displayed content corresponding to the voice application to the container corresponding to the first application.

In a possible implementation manner, the screen-projecting module 1003 includes:

an encoding unit, configured to perform encoding processing on content in the container corresponding to the first application using an encoder to obtain an encoding result; and a sending unit, configured to send the encoding result to the terminal device.

In a possible implementation manner, the processing module 1002 includes:

a determining unit, configured to determine a target area in the first page; and an adding unit, configured to add the to-be-displayed content corresponding to the voice application to the target area to obtain the to-be-projected page corresponding to the first application.

In a possible implementation manner, the voice interaction instruction is a wake-up instruction for waking up the voice application; and the adding unit is specifically configured to:

add reply information corresponding to the wake-up instruction to the target area.

In a possible implementation manner, the voice interaction instruction is a request instruction for requesting the voice application to perform a preset operation; and the adding unit is specifically configured to:

add at least part of the request instruction received to the target area in a process of receiving the request instruction; and add reply information corresponding to the request instruction to the target area after receiving of the request instruction is completed.

In a possible implementation manner, the processing module 1002 further includes: an identifying unit;

the identifying unit is configured to perform intent recognition processing on the at least part of the request instruction received to identify an intent category of a user in the process of receiving the request instruction; and the adding unit is specifically configured to add the reply information corresponding to the request instruction to the target area after the receiving of the request instruction is completed if the intent category is a first preset category.

In a possible implementation manner, the processing module 1002 further includes: a generating unit; and the generating unit is configured to:

draw a full-screen page of the voice application if the intent category is a second preset category; and fill the reply information corresponding to the request instruction into the full-screen page after the receiving of the request instruction is completed; and the screen-projecting module is specifically configured to project the full-screen page after filling onto the screen of the terminal device.

The apparatus for controlling display in the screen projection scenario provided in this embodiment may be used to implement the technical solutions in any of the foregoing method embodiments, and their implementation principles and technical effects are similar, which will not be repeated here.

According to the embodiments of the present application, the present application also provides an electronic device and a readable storage medium.

Figure 11:
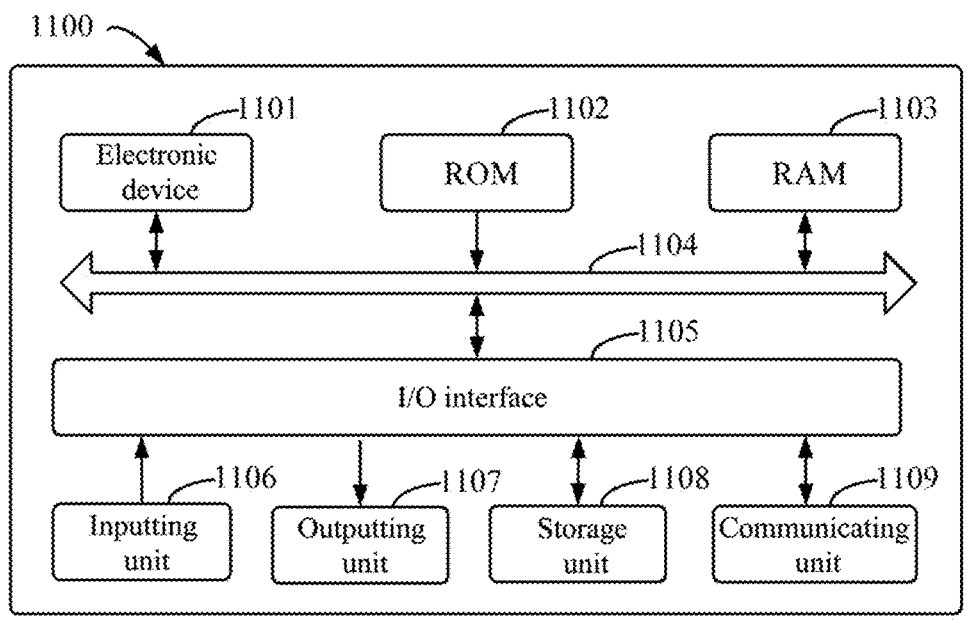
FIG. 11 is a schematic structural diagram of an electronic device provided by an embodiment of the present application.

According to an embodiment of the present application, the present application also provides a computer program product, where the computer program product includes: a computer program, and a computer program is stored in a readable storage medium, at least one processor of an electronic device can read the computer program from the readable storage medium, and at least one processor executes the computer program to make the electronic device execute the solution provided by any of the above embodiments FIG. 11 shows a schematic block diagram of an example electronic device which can be used to implement embodiments of the present application. The electronic device is intended to represent various forms of digital computers, such as a laptop computer, a desktop computer, a workbench, a personal digital assistant, a server, a blade server, a mainframe computer, and other suitable computers. The electronic device can also represent various forms of mobile apparatus, such as a personal digital assistant, a cellular phone, a smart phone, a wearable device, and other similar computing apparatus. The electronic device of this embodiment may be a smart rearview mirror, or a chip, a module or a device integrated in the smart rearview mirror. The components, their connections and relationships, and their functions herein are merely examples, and are not intended to limit an implementation of the present disclosure described and/or claimed herein.

As shown in FIG. 11, the electronic device 1100 includes a computing unit 1101, which may perform various appropriate actions and processes according to a computer program stored in a read-only memory (ROM) 1102 or a computer program loaded from a storage unit 1108 into a random access memory (RAM) 1103. In the RAM 1103, various programs and data required for the operation of the device 1100 may also be stored. The computing unit 1101, the ROM 1102, and the RAM 1103 are connected to each other through a bus 1104. An input/output (I/O) interface 1105 is also connected to the bus 1104.

Multiple components in the device 1100 are connected to the I/O interface 1105, including: an inputting unit 1106, such as a keyboard, a mouse, etc.; an outputting unit 1107, such as various types of displays, speakers, etc.; and a storage unit 1108, such as a magnetic disk, an optical disk, etc.; and a communicating unit 1109, such as an network card, a modem, a wireless communication transceiver, etc. The communicating unit 1109 allows the device 1100 to exchange information/data with other devices through a computer network such as the Internet and/or various telecommunication networks.

The computing unit 1101 may be various general and/or special-purpose processing components with processing and computing capabilities. Some examples of the computing unit 1101 include, but are not limited to, a central processing unit (CPU), a graphics processing unit (GPU), various dedicated artificial intelligence (AI) computing chips, various computing units that run machine learning model algorithms, and digital signal processing (DSP), as well as any appropriate processor, a controller, a microcontroller, etc. The computing unit 1101 executes the various methods and processes described above, such as the method for controlling display in a screen projection scenario. For example, in some embodiments, the method for controlling display in a screen projection scenario may be implemented as a computer software program, which is tangibly contained in a machine-readable medium, such as the storage unit 1108. In some embodiments, part or all of the computer program may be loaded and/or installed on the device 1100 via the ROM 1102 and/or the communicating unit 1109. When the computer program is loaded into the RAM 1103 and executed by the computing unit 1101, one or more steps of the method for controlling display in a screen projection scenario described above may be executed. Alternatively, in other embodiments, the computing unit 1101 may be configured to execute the method for controlling display in a screen projection scenario through any other suitable means (for example, by a firmware).

According to an embodiment of the present application, the present application also provides a smart rearview mirror. The smart rearview mirror may include the electronic device in the above embodiment. Specifically, the smart rearview mirror includes at least one processor; and a memory communicatively connected with the at least one processor; where the memory stores instructions executable by the at least one processor, and the instructions are executed by the at least one processor, so that the at least one processor can execute the method for controlling display in a screen projection scenario in any of the foregoing embodiments.

The various implementations of the systems and technologies described above in this article can be implemented in a digital electronic circuit system, an integrated circuit system, a field programmable gate array (FPGA), an application-specific integrated circuit (ASIC), an application-specific standard product (ASSP), a system on chip system (SOC), a load programmable logic device (CPLD), a computer hardware, a firmware, a software, and/or a combination thereof. These various embodiments may include: being implemented in one or more computer programs, the one or more computer programs may be executed and/or interpreted on a programmable system including at least one programmable processor, the programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

The program code used to implement the method of the present application can be written in any combination of one or more programming languages. The program code can be provided to a processor or a controller of a general-purpose computer, a special-purpose computer, or other programmable data processing apparatus, so that when the program code is executed by the processor or the controller, functions specified in the flowcharts and/or block diagrams are implemented. The program code may be executed entirely on a machine, partly executed on the machine, partly executed on the machine and partly executed on a remote machine as an independent software package, or entirely executed on a remote machine or a server.

In the context of the present disclosure, a machine-readable medium may be a tangible medium, which may contain or store a program for use by an instruction execution system, apparatus, or device or in combination with an instruction execution system, apparatus, or device. The machine-readable medium may be a machine-readable signal medium or a machine-readable storage medium. The machine-readable medium may include, but is not limited to electronic, magnetic, optical, electromagnetic, or infrared, or a semiconductor system, apparatus, or device, or any suitable combination of the foregoing. More specific examples of the machine-readable storage media would include electrical connections based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

In order to provide interaction with users, the systems and techniques described herein may be implemented on a computer, where the computer has: a display apparatus (for example, a CRT (cathode ray tube) or an LCD (liquid crystal display) monitor) for displaying information to users; and a keyboard and a pointing apparatus (for example, a mouse or a trackball) though which users may provide input to the computer. Other types of apparatus may also be used to provide interaction with users; for example, the feedback provided to users may be any form of sensing feedback (for example, visual feedback, audible feedback, or tactile feedback); and the input from users may be received in any form (including sound input, voice input, or tactile input).

The systems and techniques described herein may be implemented in a computing system that includes a back end component (for example, a data server), or a computing system that includes a middleware component (for example, an application server), or a computing system that includes a front end component (for example, a user computer with a graphical user interface or a web browser, through which the user can interact with the implementations of the systems and techniques described herein), or a computing system that includes any combination of such back end component, middleware component, or front end component. System components may be connected to each other by any form or medium of digital data communication (for example, a communication network). Examples of the communication network include: a local area network (LAN), a wide area network (WAN) and Internet.

A computer system may include a client and a server. The client and the server are generally far from each other and usually perform interactions through a communication network. A relationship between the client and the server is generated by computer programs running on corresponding computers and having a client-server relationship. The server may be a cloud server, also known as a cloud computing server or a cloud host, which is a host product in the cloud computing service system to solve the disadvantages of difficult management and weak business scalability in a traditional physical host and Virtual Private Server (VPS for short) service. The server may also be a server of a distributed system, or a server combined with a blockchain.

It should be understood that various forms of processes shown above can be used, and steps may be reordered, added, or deleted. For example, the steps described in the present application may be performed in parallel or sequentially or in different orders. As long as desired results of the technical solutions disclosed in the present application can be achieved, no limitation is made herein.

The above specific embodiments do not constitute a limitation to the protection scope of the present application. Persons skilled in the art should know that various modifications, combinations, sub-combinations and substitutions can be made according to design requirements and other factors. Any modification, equivalent replacement and improvement made within the spirit and principle of the present application shall be included in the protection scope of the present application.

What is claimed is:

1. A method for controlling display in a screen projection scenario, wherein the method is applied to a smart rearview mirror of a vehicle, the smart rearview mirror is installed with a voice application and at least one non-voice application, and the method comprises:
receiving a voice interaction instruction corresponding to the voice application;
if a first page corresponding to a first application in the at least one non-voice application has been projected in full-screen view onto a screen of a terminal device, adding to-be-displayed content corresponding to the voice application to the first page to obtain a to-be-projected page corresponding to the first application; wherein the to-be-projected page is a full-screen page which is formed by covering the first page partially with the to-be-displayed content; and
projecting the to-be-projected page onto the screen of the terminal device;
wherein the adding the to-be-displayed content corresponding to the voice application to the first page to obtain the to-be-projected page corresponding to the first application comprises:
determining a target area in the first page, wherein the target area is an area of the first page where the to-be-displayed content covers the first page; and
adding the to-be-displayed content corresponding to the voice application to the target area to obtain the to-be-projected page corresponding to the first application;
wherein the voice interaction instruction is a request instruction for requesting the voice application to perform a preset operation; and the adding the to-bedisplayed content corresponding to the voice application to the target area comprises:
adding at least part of the request instruction received to the target area in a process of receiving the request instruction; and
adding reply information corresponding to the request instruction to the target area after receiving of the request instruction is completed.

2. The method according to claim 1, wherein each application corresponds to a container and different applications correspond to different containers, and the container corresponding to each application is used to store content of a to-be-projected page corresponding to the application;
the adding the to-be-displayed content corresponding to the voice application to the first page to obtain the to-be-projected page corresponding to the first application comprises:
acquiring a container corresponding to the first application, wherein the container corresponding to the first application comprises content of the first page; and
adding the to-be-displayed content corresponding to the voice application to the container corresponding to the first application.

3. The method according to claim 2, wherein the projecting the to-be-projected page onto the screen of the terminal device comprises:
performing encoding processing on the content in the container corresponding to the first application using an encoder to obtain an encoding result; and
sending the encoding result to the terminal device.

4. The method according to claim 2, wherein the adding the to-be-displayed content corresponding to the voice application to the first page to obtain the to-be-projected page corresponding to the first application comprises:
determining a target area in the first page, wherein the target area is an area of the first page where the to-be-displayed content covers the first page; and
adding the to-be-displayed content corresponding to the voice application to the target area to obtain the to-be-projected page corresponding to the first application.

5. The method according to claim 3, wherein the adding the to-be-displayed content corresponding to the voice application to the first page to obtain the to-be-projected page corresponding to the first application comprises:
determining a target area in the first page, wherein the target area is an area of the first page where the to-be-displayed content covers the first page; and
adding the to-be-displayed content corresponding to the voice application to the target area to obtain the to-be-projected page corresponding to the first application.

6. The method according to claim 1, wherein the voice interaction instruction is further a wake-up instruction for waking up the voice application; and the adding the to-be-displayed content corresponding to the voice application to the target area comprises:
adding reply information corresponding to the wake-up instruction to the target area.

7. The method according to claim 1, further comprising:
performing intent recognition processing on the at least part of the request instruction received to identify an intent category of a user in the process of receiving the request instruction; and
the adding the reply information corresponding to the request instruction to the target area after the receiving of the request instruction is completed comprises:
adding the reply information corresponding to the request instruction to the target area after the receiving of the request instruction is completed if the intent category is a first preset category.

8. The method according to claim 7, wherein after identifying the intent category of the user, the method further comprises:
drawing a full-screen page of the voice application if the intent category is a second preset category;
filling the reply information corresponding to the request instruction into the full-screen page after the receiving of the request instruction is completed; and
projecting the full-screen page after filling onto the screen of the terminal device.

9. An electronic device, comprising:
at least one processor; and
a memory communicatively connected to the at least one processor;
wherein the memory is stored with instructions executable by the at least one processor, and the instructions are executed by the at least one processor to enable the at least one processor to: receive a voice interaction instruction corresponding to the voice application;
if a first page corresponding to a first application in the at least one non-voice application has been projected in full-screen view onto a screen of a terminal device, add to-be-displayed content corresponding to the voice application to the first page to obtain a to-be-projected page corresponding to the first application; wherein the to-be-projected page is a full-screen page which is formed by covering the first page partially with the to-be-displayed content; and
project the to-be-projected page onto the screen of the terminal device;
wherein the at least one processor is further configured to:
determine a target area in the first page, wherein the target area is an area of the first page where the to-be-displayed content covers the first page; and
add the to-be-displayed content corresponding to the voice application to the target area to obtain the to-be-projected page corresponding to the first application;
wherein the voice interaction instruction is a request instruction for requesting the voice application to perform a preset operation; and the at least one processor is specifically configured to:
add at least part of the request instruction received to the target area in a process of receiving the request instruction; and
add reply information corresponding to the request instruction to the target area after receiving of the request instruction is completed.

10. The electronic device according to claim 9, wherein each application corresponds to a container and different applications correspond to different containers, and the container corresponding to each application is used to store content of a to-be-projected page corresponding to the application; and the at least one processor is specifically configured to:
acquire a container corresponding to the first application, wherein the container corresponding to the first application comprises content of the first page; and
add the to-be-displayed content corresponding to the voice application to the container corresponding to the first application.

11. The electronic device according to claim 10, wherein the at least one processor is further configured to:

perform encoding processing on the content in the container corresponding to the first application using an encoder to obtain an encoding result; and send the encoding result to the terminal device.

12. The electronic device according to claim 9, wherein the voice interaction instruction is further a wake-up instruction for waking up the voice application; and the at least one processor is specifically configured to:

add reply information corresponding to the wake-up instruction to the target area.

13. The electronic device according to claim 9, wherein the at least one processor is further configured to:

perform intent recognition processing on the at least part of the request instruction received to identify an intent category of a user in the process of receiving the request instruction; and add the reply information corresponding to the request instruction to the target area after the receiving of the request instruction is completed if the intent category is a first preset category.

14. The electronic device according to claim 13, wherein the at least one processor is further configured to:

draw a full-screen page of the voice application if the intent category is a second preset category;

fill the reply information corresponding to the request instruction into the full-screen page after the receiving of the request instruction is completed; and project the full-screen page after filling onto the screen of the terminal device.

15. A smart rearview mirror, comprising the electronic device according to claim 9.

16. A non-transitory computer readable storage medium stored with computer instructions, wherein the computer instructions are configured to enable a computer to:

receive a voice interaction instruction corresponding to the voice application;

if a first page corresponding to a first application in the at least one non-voice application has been projected in full-screen view onto a screen of a terminal device, add to-be-displayed content corresponding to the voice application to the first page to obtain a to-be-projected page corresponding to the first application; wherein the to-be-projected page is a full-screen page which is formed by covering the first page partially with the to-be-displayed content; and project the to-be-projected page onto the screen of the terminal device;

wherein the computer instructions are configured to further enable the computer to:

determine a target area in the first page, wherein the target area is an area of the first page where the to-be-displayed content covers the first page; and add the to-be-displayed content corresponding to the voice application to the target area to obtain the to-be-projected page corresponding to the first application; and wherein the voice interaction instruction is a request instruction for requesting the voice application to perform a preset operation; and the computer instructions are configured to further enable the computer to:

add at least part of the request instruction received to the target area in a process of receiving the request instruction; and add reply information corresponding to the request instruction to the target area after receiving of the request instruction is completed.

* * * * *